Jan. 21, 1936.  W. E. MOLINS  2,028,681
GRINDING OF ROTATING ECCENTRIC KNIVES
Filed Jan. 11, 1934
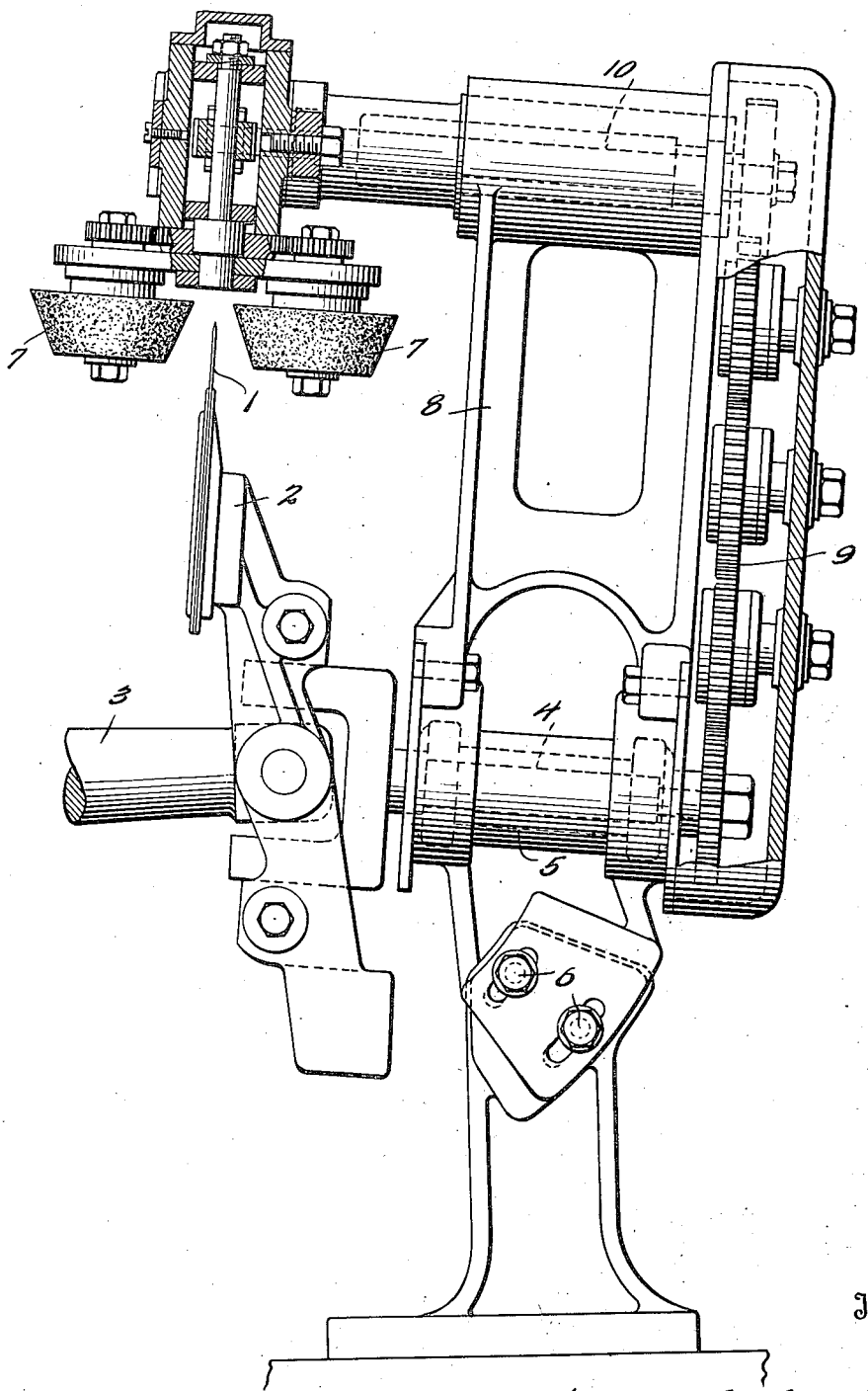
Inventor
Walter E. Molins,
By Watson, Coit, Morse
 & Grindle
Attorney Patented Jan. 21, 1936

2,028,681

UNITED STATES PATENT OFFICE 2,028,681

GRINDING OF ROTATING ECCENTRIC KNIVES

Walter Everett Molins, Deptford, London, England; Harold Bernardo Molins and Moses Hyman Isaacs, executors of said Walter Everett Molins, deceased Application January 11, 1934, Serial No. 706,266
In Great Britain January 11, 1933

5 Claims. (Cl. 51—247)

This invention is for improvements in or relating to the grinding of rotating eccentric knives and in particular to the mountings for knife grinding means for cigarette machines of the continuous rod type.

The present invention provides the combination with a cutting device for severing axially moving rods into lengths, which comprises two members, one at least of which is rotatable, whose axes are fixed against axial movement and are inclined to one another and the axis of one of said members is adjustable angularly, a knife carried by at least one of the said members, and means providing an operative engagement between the knife and both members whereby the knife is adapted to rotate about one of the said fixed axes and is movable axially of one of the members, of a grinder for the knife, and means movable with the angularly adjustable member and connected with the grinding element for the purpose of automatically moving the grinder each time the inclined axis of the cutting device is adjusted.

It will be appreciated that with cutting devices as above described, the knife edge occupies a different position in space each time the inclined axis is adjusted to enable the knife to cut cigarettes of different lengths. By providing means movable with the angularly adjustable member and connected with the grinding element, the latter is reset automatically whenever the cutting device is adjusted to cut a different length of cigarette.

The invention will be more particularly described with reference to the accompanying drawing which shows a side elevation of a cutting mechanism provided with a grinder constructed in accordance with the present invention.

Like reference numerals refer to like parts throughout the specification and drawing.

The knife 1 is mounted on a rotatable carrier 2 which is supported by the shafts 3 and 4. The shaft 4 is inclined downwardly and is so mounted in a bearing 5 which is adjustable through the medium of the screws 6, that the shaft 5 is itself adjustable. In this way the stroke of the knife can be varied in order to cut cigarettes of different length.

The grinder 7 is carried by a bracket 8 which is fixed to the bearing 5 in such a manner that when the bearing 5 is adjusted for the purpose above described, the grinder is always maintained in the same position relatively to the path of the knife edge.

The grinder receives its movement from the shaft 4 as is shown in the drawing through the medium of the train of gears 9 one of which is fixed to the spindle 4 and one to the spindle 10 to which the grinder is connected. It will be appreciated that other means may be provided to impart the necessary motion to the shaft 10 for example, a pulley can be placed on the shafts 4 and 10 and connected by a belt.

It will be seen that the arrangement of mounting the grinder 7 on the bearing 5 of the inclined shaft 4 enables the grinder to be moved automatically whenever the knife 1 is set for cutting cigarettes of a different length, and avoids the previous difficulty in having to re-set the grinder every time the inclined shaft is adjusted. In the construction shown in the drawing the grinder 7 is arranged to grind the knife at a time when the latter has substantially no component of movement in an axial direction.

The method of mounting the grinder or grinders on the bearing of the adjustable shaft so as to be movable therewith may be applied to any one of the grinders described in co-pending patent applications Serial Nos. 700,713 and 700,714, filed December 2, 1933.

It will be appreciated that this method of mounting the grinder may be employed for any carrier for knives of the type described, such for example, as the knives described in prior British patent specifications Nos. 248,415 and 324,379 both of which have a shaft that is inclined to the horizontal made adjustable, as well as to the knife having an axis inclined to the cigarette rod, and having the knife set askew to the axis of rotation.

The method of mounting grinders so as to be adjusted automatically when the knife is re-set to cut cigarettes of different length may be applied therefore in such a way that the grinder is moved together with the axis about which the knife rotates so that the grinder is always in the same position relatively to the path of the knife edge.

What I claim as my invention and desire to secure by Letters Patent is:—

1. The combination with a cutting device for severing axially moving rods into lengths, said device comprising a rotating member, a knife supported on said member for rotation therewith and for axial displacement with respect thereto, a guide member associated with said knife for determining the axial displacement of the knife during rotation thereof, and means for effecting relative angular adjustment of said members substantially in a plane containing the axis of said rotating member to vary the extent of axial displacement of said knife, of a grinder for the knife, and means carried by said guide member for supporting said grinder, whereby relative adjustment of said members may be effected without disturbing the operative relation of said grinder and knife.

2. The combination with a cutting device for severing axially moving rods into lengths, said device comprising a rotating member, a knife supported on said member for rotation therewith and for axial displacement with respect thereto, a guide member associated with said knife for determining the axial displacement of the knife during rotation thereof, and means for effecting angular adjustment of said guide member with respect to the axis of said rotating member to vary the extent of axial displacement of said knife, of a grinder positioned for engagement with the knife at a point in the path of movement of the latter at which substantially no axial displacement is imparted to the latter, and means carried by said guide member for supporting said grinder, whereby relative adjustment of said members may be effected without disturbing the operative relation of said grinder and knife.

3. The combination with a cutting device for severing axially moving rods into lengths, said device comprising a rotating member, a knife supported on said member for rotation therewith and for axial displacement with respect thereto, a guide member associated with said knife for determining the axial displacement of the knife during rotation thereof, and means for angularly adjusting one of said members with respect to the other to vary the extent of axial displacement of said knife, of a grinder for the knife, a mounting for said grinder, and an operative connection between said mounting and said adjustable member for altering the position of said mounting when angular adjustment of said members is effected.

4. The combination with a cuting device for severing axially moving rods into lengths, said device comprising a rotating member, a knife supported on said member for rotation therewith and for axial displacement with respect thereto, a guide member associated with said knife for determining the axial displacement of the knife during rotation thereof, and means for effecting relative angular adjustment of said members substantially in a plane containing the axis of said rotating member to vary the extent of axial displacement of said knife, of a grinder for the knife, means carried by said guide member for supporting said grinder, whereby relative adjustment of said members may be effected without disturbing the operative relation of said grinder and knife, and a driving connection between said rotatable member and said grinder for driving the latter from the former.

5. The combination with a cutting device for severing axially moving rods into lengths, said device comprising two rotatable members whose axes are inclined to one another, the axis of one of said members being adjustable angularly, an adjustable bearing in which the said angularly adjustable member is rotatably mounted, and means providing an operative engagement between the knife and both members whereby the knife is adapted to rotate about one of the said fixed axes and is movable axially of one of the members, of a grinding element for the knife, said grinding element engaging the knife at a time when the knife has substantially no component of movement in an axial direction, and a mounting for the grinding element, said mounting being fixed relatively to the said adjustable bearing.

WALTER EVERETT MOLINS.